(12) United States Patent
Bono et al.

(10) Patent No.: US 7,337,700 B2
(45) Date of Patent: Mar. 4, 2008

(54) PRECISION TOOL HOLDER WITH FLEXURE-ADJUSTABLE, THREE DEGREES OF FREEDOM FOR A FOUR-AXIS LATHE

(75) Inventors: Matthew J. Bono, Pleasanton, CA (US); Robin L. Hibbard, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 11/652,839

(22) Filed: Jan. 12, 2007

(65) Prior Publication Data

US 2007/0261522 A1    Nov. 15, 2007

Related U.S. Application Data

(60) Provisional application No. 60/758,729, filed on Jan. 12, 2006.

(51) Int. Cl.
  *B23E 21/00*    (2006.01)
  *B23E 1/00*    (2006.01)
(52) U.S. Cl. ............................. 82/123; 82/157; 82/158
(58) Field of Classification Search ................ 82/1.11, 82/157, 158, 123, 159, 121; 409/199, 132, 409/142, 143, 54, 65; 451/18; 29/54
See application file for complete search history.

(56) References Cited

U.S. PATENT DOCUMENTS

| | | | | |
|---|---|---|---|---|
| 5,067,284 A | * | 11/1991 | Putnam et al. ................ 451/28 |
| 5,250,880 A | * | 10/1993 | Chesney et al. ............. 318/135 |
| 5,251,522 A | * | 10/1993 | Chin-Long .................... 82/134 |
| 5,778,745 A | * | 7/1998 | Furusawa et al. ............ 82/1.11 |
| 5,802,937 A | | 9/1998 | Day |
| 6,170,367 B1 | * | 1/2001 | Keller et al. ................. 82/1.11 |
| 7,089,836 B2 | * | 8/2006 | Kato et al. ................... 82/1.11 |
| 7,089,838 B2 | * | 8/2006 | Erickson ....................... 82/158 |
| 7,178,433 B2 | * | 2/2007 | Matsuda et al. ............. 82/1.11 |
| 7,267,035 B2 | * | 9/2007 | Uebelhart ..................... 82/121 |
| 2005/0010310 A1 | | 1/2005 | Touzov |

FOREIGN PATENT DOCUMENTS

WO    WO 99/21682    5/1999

* cited by examiner

*Primary Examiner*—Willmon Fridie, Jr.
(74) *Attorney, Agent, or Firm*—James S. Tak; John H. Lee (57) ABSTRACT

A precision tool holder for precisely positioning a single point cutting tool on 4-axis lathe, such that the center of the radius of the tool nose is aligned with the B-axis of the machine tool, so as to facilitate the machining of precision meso-scale components with complex three-dimensional shapes with sub-μm accuracy on a four-axis lathe. The device is designed to fit on a commercial diamond turning machine and can adjust the cutting tool position in three orthogonal directions with sub-micrometer resolution. In particular, the tool holder adjusts the tool position using three flexure-based mechanisms, with two flexure mechanisms adjusting the lateral position of the tool to align the tool with the B-axis, and a third flexure mechanism adjusting the height of the tool. Preferably, the flexures are driven by manual micrometer adjusters. In this manner, this tool holder simplifies the process of setting a tool with sub-μm accuracy, to substantially reduce the time required to set the tool.

12 Claims, 7 Drawing Sheets

PRECISION TOOL HOLDER WITH FLEXURE-ADJUSTABLE, THREE DEGREES OF FREEDOM FOR A FOUR-AXIS LATHE

CLAIM OF PRIORITY IN PROVISIONAL APPLICATION

This application claims priority in provisional application No. 60/758,729, filed on Jan. 12, 2006, entitled "Precision Tool Holder with Three Degrees of Freedom for a 4-axis Lathe" by Matthew J. Bono et al.

STATEMENT OF FEDERALLY SPONSORED DEVELOPMENT

The United States Government has rights in this invention pursuant to Contract No. W-7405-ENG-48 between the United States Department of Energy and the University of California for the operation of Lawrence Livermore National Laboratory.

BACKGROUND OF THE INVENTION

A. Technical Field

This invention relates to machining tools. In particular, the invention relates to a precision tool holder designed to enable the machining of precision meso-scale components with complex three-dimensional shapes with sub-micron accuracy on a four-axis lathe.

B. Description of the Related Art

Figure 1:
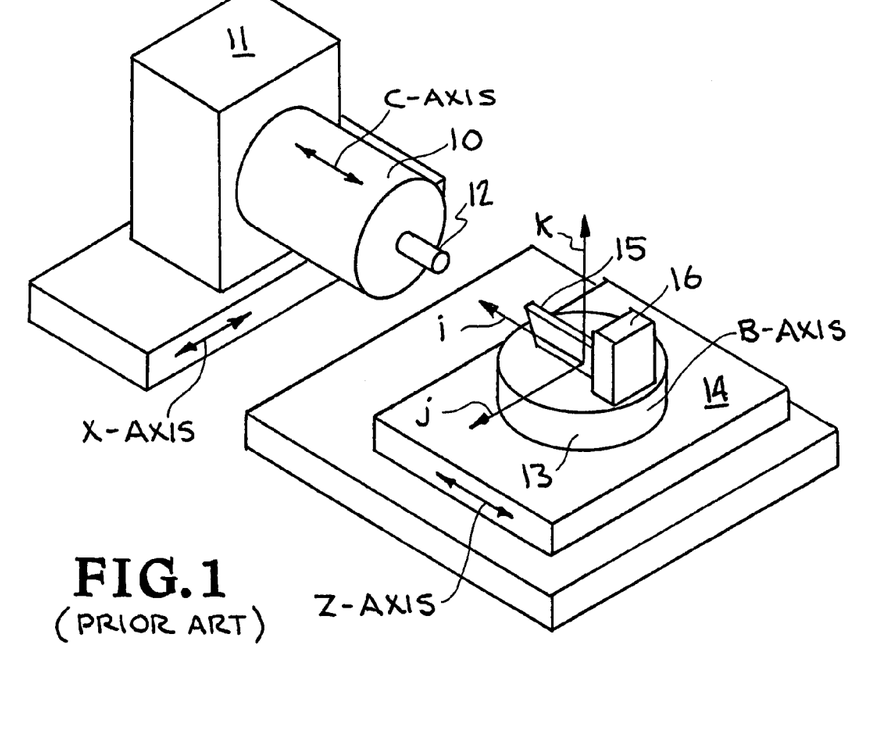
FIG. 1 is a schematic perspective view of a T-based four-axis diamond turning machine known in the prior art.

Cutting parts on a lathe is one of the oldest and most versatile machining methods. Modern versions of the lathe include four-axis diamond turning machines (hereinafter "four-axis lathe"), which incorporate a rotary table or platform that allows the cutting tool to swivel with respect to the workpiece to enable the precise machining of complex workpiece forms. The four axes of such a four-axis lathe are illustrated in FIG. 1. The spindle 10, referred to as the "C-axis" of the lathe is typically mounted on a headstock 11 which is translatable in the "x-axis," so that the spindle and the workpiece 12 may be moved toward or away from an operator. The rotary table 13 is typically mounted on a carriage 14 which is translatable in the "z-axis," so that a cutting tool 15 mounted on a tool holder 16 mounted on the rotary table may be moved toward or away from the workpiece in a direction parallel to the C-axis of the spindle. The rotary table has a rotational axis referred to as the "B-axis" for rotating the tool in the xz-plane to swivel the tool with respect to the workpiece. The rotary table and B-axis is used when machining parts with complex shapes, such as spheres or oddly shaped lenses, and it is a crucial element for machining parts with both interior and exterior features, such as components for a double shell target.

The accuracy of a machined workpiece surface, however, is generally limited by the accuracy with which the tool is set in place. And in the case of four-axis lathes, the cutting tool must be positioned at the correct height and in the correct lateral position in order to machine parts and components with sub-micron accuracy. In particular, the center of the nose of the single point diamond tool must be at the same height as the C-axis of the spindle and precisely aligned with the B-axis of the rotary table.

Various types of tool holders are commercially available and/or known in the art which enable adjustments for correctly positioning a cutting tool on a four-axis lathe. Generally, tool holders are mounted directly on the rotary table and operate to maneuver the single point tool relative to the rotary table so as to center the nose of the tool along the B-axis. To describe relative motion of the tool with respect to the rotary table, a coordinate system is defined that is fixed to the rotary table, shown in FIG. 1 as the ijk coordinate system. The ijk coordinate system has its origin directly on the B-axis of the rotary table, with the i-axis and j-axis parallel to the rotary table, and the k-axis parallel to the B-axis. The k direction is often referred to as the "height" direction. In this coordinate system, the tool holder maneuvers the tool in the i and j directions to center the tool nose with the B-axis, and also in the k direction to align the height of the cutting edge of the tool with the C-axis of the spindle.

One exemplary type of non-commercial precision tool holder known in the art was custom developed at the Lawrence Livermore National Laboratory specifically for a precision diamond turning machine called, DTM2, which allows the cutting tool to be oriented along the B-axis with nanometer precision, and enables it to be used for machining meso-scale components with complex three-dimensional shapes. This tool holder manipulates the tool in the i and j directions using pre-loaded crossed-roller bearing stages for coarse motion, and piezo stacks for fine motion. The piezo actuators provide only a few microns of motion but can manipulate the tool with a precision on the order of tens of nanometers. The tool is moved in the k direction by a hydraulic lift that provides nanometer positioning precision. This tool holder, however, is a complicated design that requires a control system to drive the piezo actuators and is considered too large in size for modern commercial diamond turning machines.

One exemplary type of commercial tool holder known in the art uses sliding plates that are preloaded with set screws and adjusted with differential screws for making adjustments (within a few microns) in the i, j, and k directions of the ijk coordinate system. Such sliding-plate tool holders, however, can exhibit cross-talk, i.e. where tool adjustment in one of the i and j directions can cause movement by more than 1 μm in each of the other orthogonal directions, which complicates setting the tool with sub-μm accuracy in all the i, j, and k directions simultaneously. For example, depending on the circumstances and the required level of accuracy, setting the tool correctly can take a skilled operator up to 16 hours. In addition, each time the tool is adjusted friction becomes trapped in the sliding components of the tool holder. If proper measures are not exercised this trapped friction can be released in the form of incremental slipping of the sliding plates. This slipping can cause the tool to move several μm over the course of a few days, which further complicates the issue of keeping the tool centered correctly on the B-axis. Each time the tool moves, its position must be reset. Therefore, when machining precision components, a significant portion of the machinist's time is typically spent setting, resetting, and checking the tool position. As such, such sliding-plate tool holders have limited accuracy and cannot position the tool with the precision required for machining complex high-precision parts and components, such as for example high-precision meso-scale laser targets.

It is notable that even if one of the ijk directions (such as the k height direction) did not involve sliding plate actuation, but was rather based on a flexure-based actuator mechanism, the set of sliding plates used for adjustment in the i and j directions would make the adjustment precision in those sliding directions on the order of several microns, which is not suitable for precision machining of complex meso-scale components with sub-μm profile requirements.

It is further notable that many industrial diamond turned parts and components machined on four-axis machine tools are either relatively large or have shallow profiles, such as lenses or molds. For such large workpieces, various metrologies of the workpiece and error-compensation methodologies are available such that high-precision tool holders are not necessarily required, and tool setting errors of several microns or more are tolerable when used in conjunction with such methods. For example, an interferometer or displacement probe, such as a linear variable displacement transducer (LVDT), can be used to measure the profile of the machined part to map the error of the surface figure. The machine tool can then compensate for any workpiece profile error to machine the desired profile. When used in such manner, such commercial tool holders provide a simple means of positioning the tool within a few microns of the axis of rotation of the B-axis, and as such work well for their intended method of operation. However, in contrast to workpieces that are large enough and stable enough to be measured accurately with the LVDT, such error compensation techniques are difficult to apply to meso-scale components with complex three-dimensional shapes, such as components for laser targets, since these components often contain both interior and exterior features or they are too complex or too fragile to be reliably measured. Therefore, in order to correctly machine the sub-micron profiles of such complex meso-scale components, the cutting edge of the tool must traverse the correct path along the workpiece surface which necessitates that the tool be accurately positioned.

Another alternative to precision tool setting on the ijk coordinate system that is known in the art is to establish a virtual axis in the k direction that passes through the actual location of the center of the tool nose. In this method, the machine tool may be programmed in this virtual, tool-centered coordinate system by using combined motion of the x-, z-, and B-axis to produce the desired motion of the tool relative to the center of the tool nose. Such an approach would require only that the actual location of the tool be known, but it would not require that the tool be positioned in any particular location. The advantage of programming in a virtual coordinate system is that commercially available tool holders could be used to position the tool adequately. However, many commercially available four-axis diamond turning machines do not currently have the capability to allow programming in a virtual, tool-centered coordinate system.

What is needed therefore is a tool holder designed to precisely position a single point diamond tool on the B-axis of a four-axis lathe, and capable of adjusting the cutting tool position in three orthogonal directions over a suitable range of motion with sub-micron precision, e.g. up to tens of nanometers precision. Furthermore, such a tool would preferably be immune to any potential detrimental effects of trapped friction, and have very little parasitic error motion, e.g. less than 0.1 micron, to improve the precision and setup efficiency with which complex workpieces, such as meso-scale components, can be fabricated using commercially available four-axis lathes.

SUMMARY OF THE INVENTION

One aspect of the present invention includes an apparatus for controlling the spatial position of an article comprising: a first adjustment mechanism having a first base fixed relative to an ijk coordinate system, a first platform, at least two parallel flexure hinges connecting the first platform to the first base to enable and guide movement of the first platform in a direction parallel to the i axis of the ijk coordinate system, and means for actuating the first platform to adjust the i-axis position thereof relative to the first base; a second adjustment mechanism having a second base fixed relative to the first platform, a second platform, at least two parallel flexure hinges connecting the second platform to the second base to enable and guide movement of the second platform in a direction parallel to the j axis of the ijk coordinate system, and means for actuating the second platform to adjust the j-axis position thereof relative to the second base; and a third adjustment mechanism having a third base fixed relative to the second platform, a third platform having means for holding the article thereon, at least one flexure hinge connecting the third platform to the third base to guide movement of a held article in a direction parallel to the k axis of the ijk coordinate system, and means for actuating the third platform to adjust the k-axis position of the held article relative to the third base.

Another aspect of the present invention includes a tool holder for controlling the relative spatial position of a tool on a B-axis platform of a four axis lathe, comprising: a first flexure-guided stage having at least two flexure hinges capable of flexing only in an i-axis direction of an ijk orthogonal coordinate system which is fixed relative to the B-axis platform, for guiding the tool in a direction of the i-axis; a second flexure-guided stage having at least two flexure hinges capable of flexing only in a j-axis direction of the ijk orthogonal coordinate system, for guiding the tool in a direction of the j-axis; a third flexure-guided stage having means for holding a tool thereon and at least one flexure hinge capable of flexing only in a k-axis direction of an ijk orthogonal coordinate system for guiding the tool in a direction of the k-axis; a first actuator for actuating the first flexure-guided stage to adjust the i-axis position of a held tool; a second actuator for actuating the second flexure-guided stage to adjust the j-axis position of the held tool; and a third actuator for actuating the third flexure-guided stage to adjust the k-axis position of the held tool.

Generally, the present invention relates to a tool holder capable of precisely positioning a single point diamond tool on the B-axis of a four-axis diamond turning machine or lathe. In particular, the tool holder is designed to adjust the cutting tool position in three orthogonal directions with sub-micron resolution, e.g. up to 20 nm resolution using flexure-based adjustment mechanisms to move the cutting tool. In particular, flexure hinges are used which enable and guide movement of a platform of lever arm in only one of the ijk directions with minimal parasitic error. As such, the tool holder does not contain any mechanical components with surfaces that slide relative to each other, so there is no potential for trapped friction to be released and cause unintended movement of the cutting tool. Also, the crosstalk between axes when making flexure-based adjustments is minimal and insignificant, with parasitic error motion typically less than 0.1 µm, so it enables tools to be set relatively rapidly to machine complex components with sub-µm accuracy. And making an adjustment to the tool position requires the user to simply turn a manual micrometer adjuster, which is much simpler than the process required for previously designed tool holders.

BRIEF DESCRIPTION OF THE DRAWINGS

The accompanying drawings, which are incorporated into and form a part of the disclosure, are as follows.

DETAILED DESCRIPTION

Figure 2:
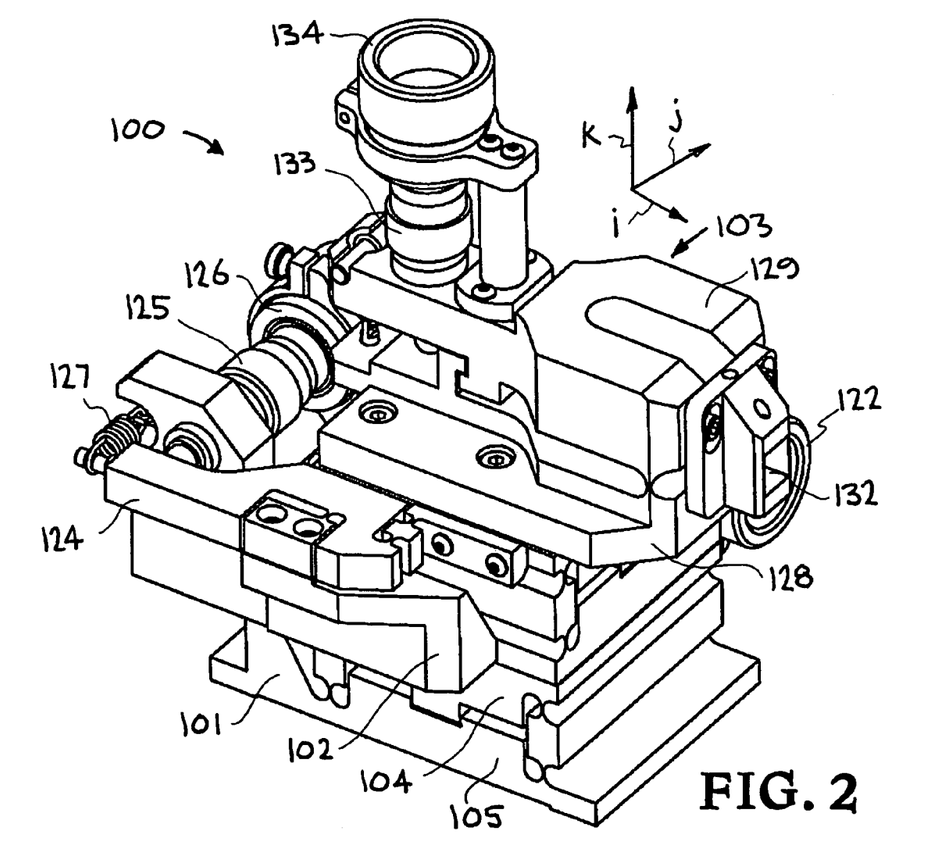
FIG. 2 is front isometric view of an exemplary embodiment of the precision tool holder of the present invention.
Figure 3:
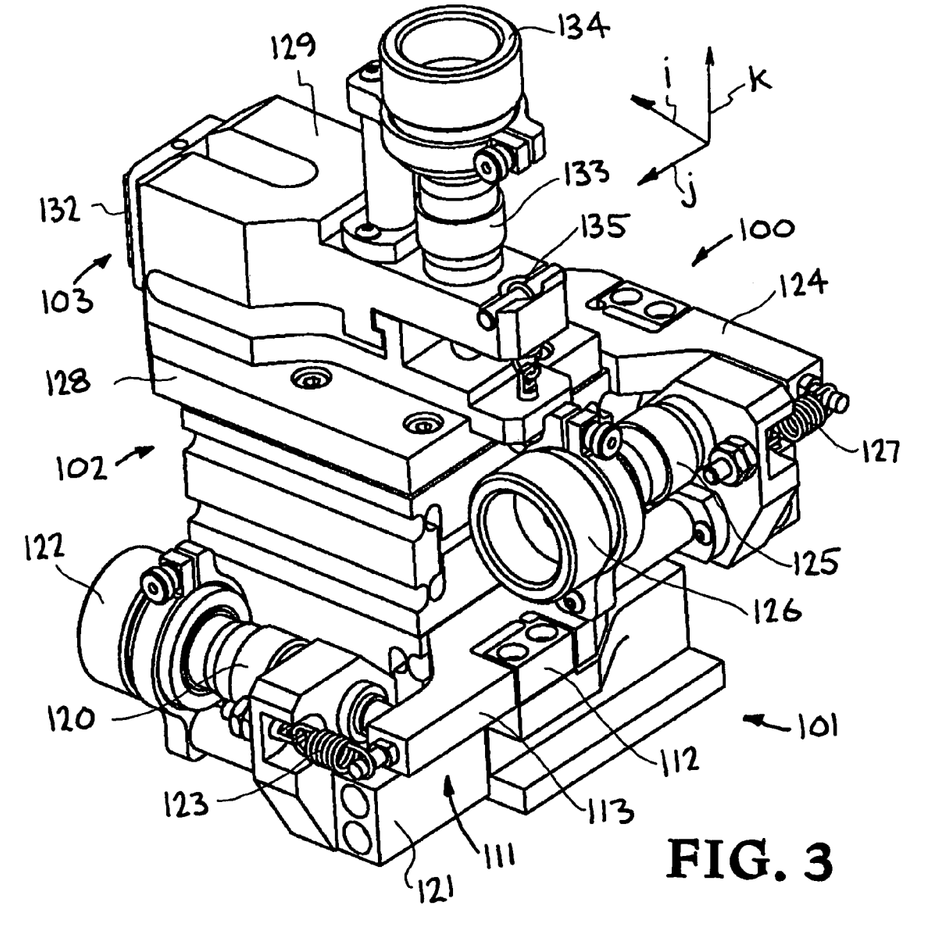
FIG. 3 is a back isometric view of the precision tool holder of FIG. 2.

Turning now to the drawings, FIGS. 2 and 3 show isometric front and back views of an exemplary embodiment of the precision tool holder of the present invention, generally indicated at reference character 100, which facilitates the machining of precision meso-scale components with complex three-dimensional shapes with sub-µm accuracy on a four-axis lathe. Generally, the tool holder 100 includes three independently operable flexure-based adjustment mechanisms, indicated at 101-103, that allow adjustment of a tool in the three ijk orthogonal directions. The adjustment mechanism are stacked together to form three tiers or levels, with a first adjustment mechanism 101 shown at the bottom, a second adjustment mechanism 102 shown in the middle, and a third flexure-based adjustment mechanism 103 shown at the top. The first adjustment mechanism 101 is mountable directly on a rotary table (not shown).

Each of the three adjustment mechanisms 101-103 include a flexure assembly comprising a platform base, a movable platform movably connected to the platform base by means of a flexure hinge or hinges (e.g. 107 and 108 in FIG. 4; 114, 117, and 119 in FIG. 5; and 130 in FIG. 6) which guide movement of the platform in a direction parallel to a corresponding one of the three orthogonal ijk coordinate directions. Generally, all motion in each of the adjustment mechanisms is achieved through flexure hinges which rely on elastic deformation of a monolith, and are usually more precise and stable than sliding elements or rolling element bearings. In particular, the first and second adjustment mechanisms 101 and 102 operate to adjust the lateral position of a tool in the i and j directions so that the center of the nose radius of the tool is aligned with the B-axis of the rotary table. And the third adjustment mechanism 103 operates to adjust the height of the tool in the k axis to align the tool with the C-axis of the spindle.

Additionally, each of the three adjustment mechanisms also includes an actuator mechanism, such as a manual micrometer adjuster (120, 125, and 133), for driving/displacing a corresponding one of the platforms in one of the ijk directions. In particular, the adjuster 120 provides motion in the i direction, the adjuster 125 provides motion in the j direction, and the adjuster 133 provides motion in the k direction. Making an adjustment to the tool position requires the user to simply turn one of the manual micrometer adjusters. The tool holder preferably has a minimum increment of motion of tens of nanometers, such as 20 nm. Additionally, it may also preferably have a range of ±150 µm, and a specified load capacity of 100 N. Manual adjusters similar to micrometers are preferred because they avoid all of the complications associated with hydraulic drivers or electronic actuators, while also making the tool holder inexpensive and simple to operate.

Figure 4:
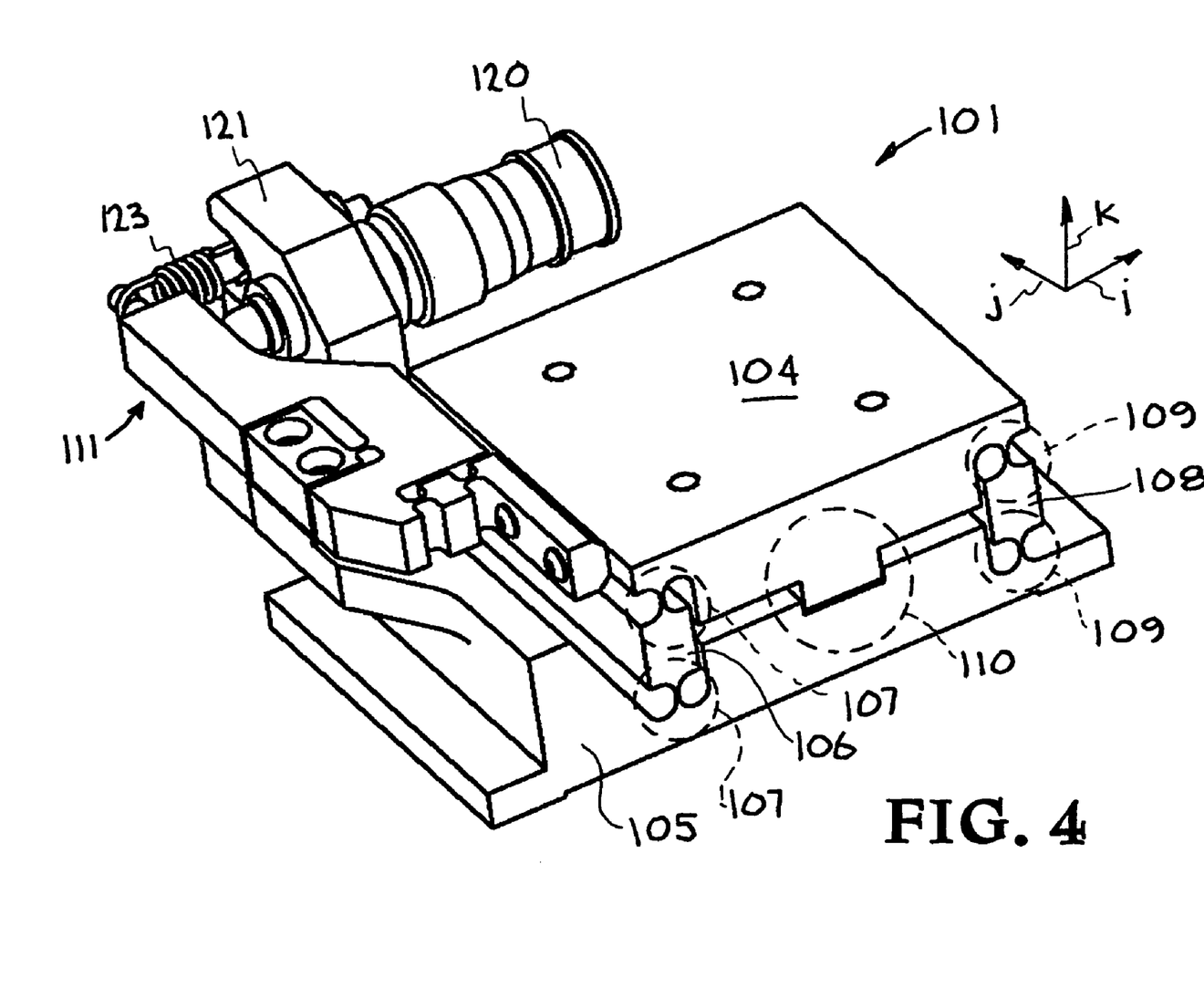
FIG. 4 is an isometric view of the flexure-based adjustment mechanism 101 of FIGS. 2 and 3 for adjusting/translating the tool position in the i direction.

In FIG. 4, a schematic illustration of the arrangement of the first adjustment mechanism 101 is shown for adjusting the tool in the i direction. Since the second adjustment mechanism 102 (shown in FIG. 2) and its operation is substantially the same as the first adjustment mechanism, the following discussion applies equally to both.

The first adjustment mechanism 101 is shown having a flexure assembly comprising a platform base 105, a movable platform 104, and four flexure hinges 107 and 109 connecting the platform to the platform base via legs (or links) 106 and 108, which form a "four bar link" flexure assembly which allows motion only in the i direction. In particular, the flexure hinges are shown as notch hinges, with each of the four notch-hinges having a narrow neck that allows the material to bend elastically at the hinge. Also, a hardstop 10 is shown which prevents the platform from moving too far and plastically deforming/damaging the notch hinges. It is appreciated that while the term "flexure hinge" is preferably defined as a single notch hinge as used above, it may in the alternative be used to describe the legs and notch hinges together as a combined unit. Characterized in this manner, the platform in FIG. 4 may be described as being movably connected to the platform base via only two flexure hinges. Furthermore, it is also appreciated that a single notch hinge may, in the alternative, be used to directly connect the platform to the platform base. Thus the term "flexure hinge" is intended to include all of the above arrangements and characterizations.

Figure 5:
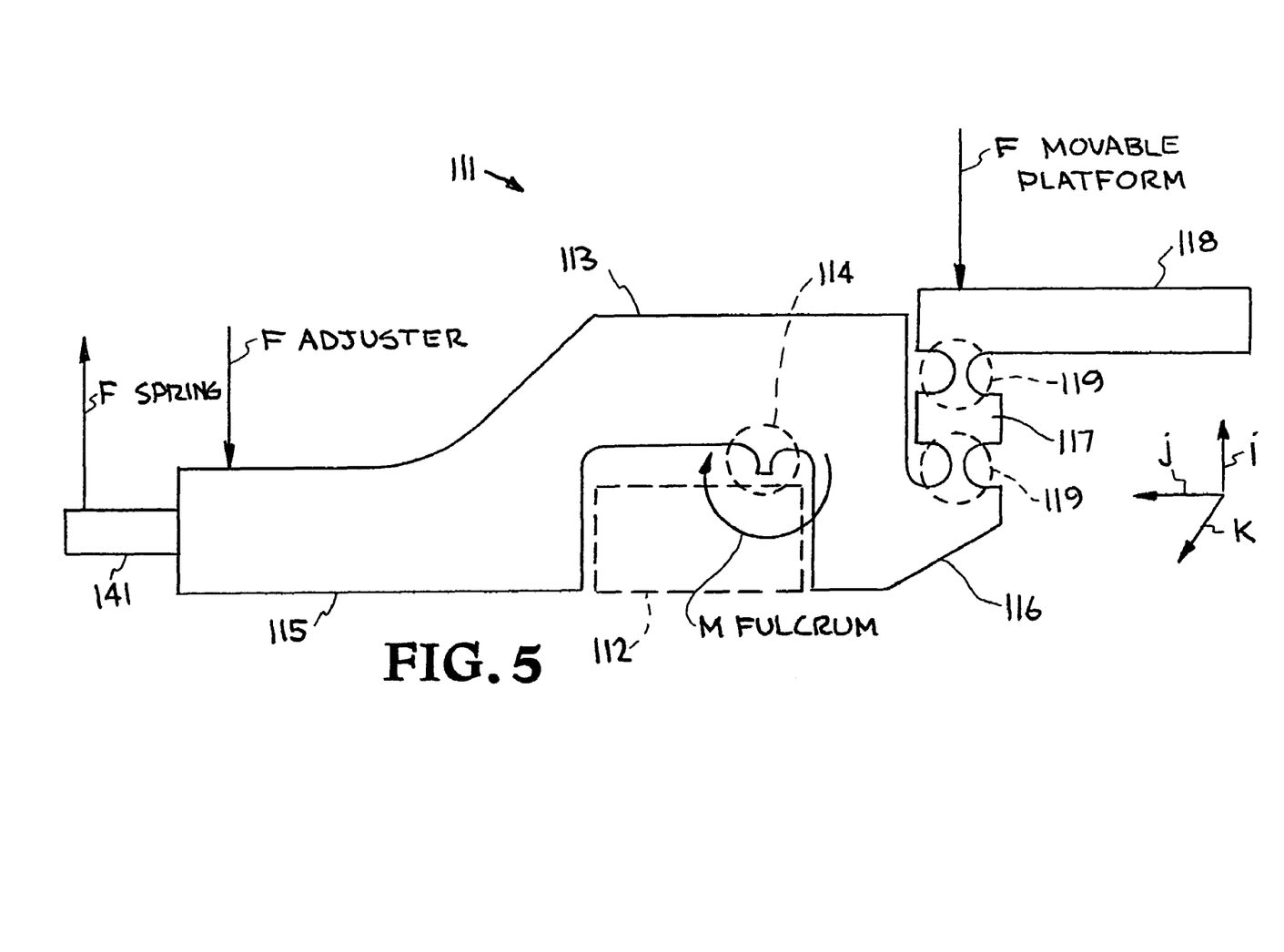
FIG. 5 is a free body diagram of the lever flexure 111 shown in FIGS. 3 and 4.

The first adjustment mechanism 101 in FIG. 4 is also shown having an actuator assembly for actuating the first platform to adjust the i-axis position thereof relative to the first base. The actuator assembly includes an actuator, such as manual adjuster 120, which is shown mounted to a mounting arm 121 connected to the platform base. One end of the adjuster has a knob (122 in FIG. 3) and an opposite end is shown contacting a lever flexure, generally indicated at 111. Greater detail of the lever flexure 111 is shown in FIG. 5 having a lever base 112 fixedly mounted to the platform base 105, with the lever base connected to a lever arm 113 via a flexure hinge 114 as the fulcrum. An input end 115 of the lever arm 113 is shown connected to and experiencing a force $F_{adjuster}$ from the actuator, as well as $F_{spring}$ from a spring 123 which holds the actuator against the input end of the lever flexure. A connector arm 141 of the input end 114 is shown connecting to the spring. Additionally, an output end 116 of the lever arm is shown connected to a connector block 118 via a leg 117 and two flexure hinges 119, with the connector block 118 fixed to the platform 104 (FIG. 4) so as to experience force $F_{movable\ platform}$ from the platform.

To move the platform 104 (and the tool) in the i direction, a user turns the knob on the manual micrometer adjuster 120, which causes the other end of the micrometer to retract or extend in either the i or −i direction. Therefore, the end of the lever flexure moves along with the micrometer. In this manner, the lever flexure 111 reduces the load on the actuator by producing a moment $M_{fulcrum}$ at the flexure hinge 114, and improves the precision with which the tool can be manipulated. The lever flexure 111 is preferably designed to provide a mechanical advantage of at least 2.5× and is held against the manual adjuster by a preload extension spring 123. In one example configuration, where the manual adjuster has a range of motion of ±150 μm, the i-motion flexure has a range of motion of ±60 μm. Because of the mechanical advantage, the minimum increment of motion of the i-motion flexure is smaller than that of the actuator.

Figure 6:
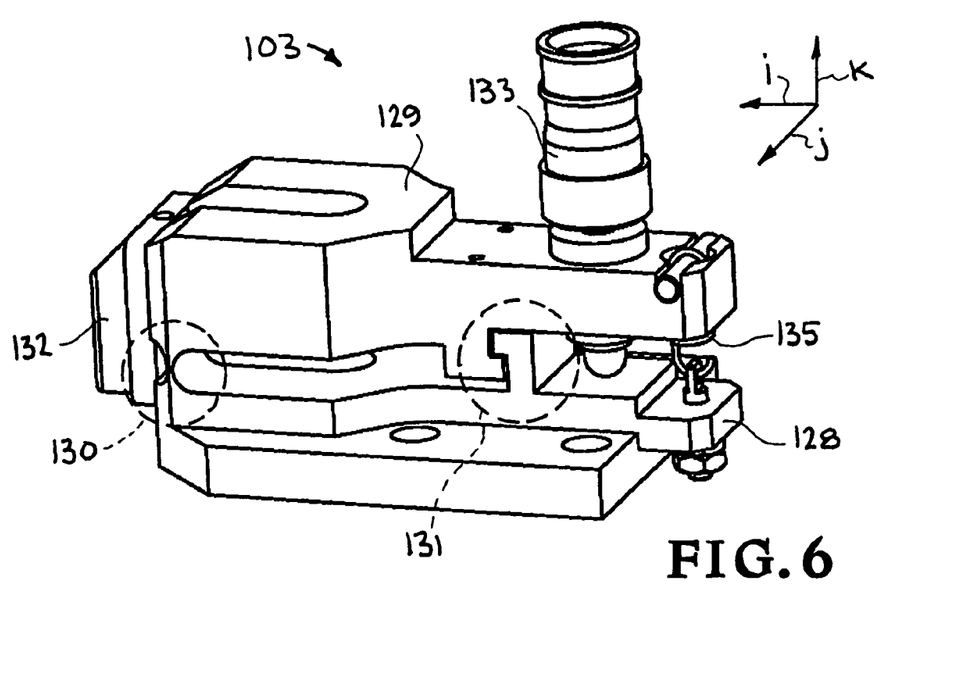
FIG. 6 is an isometric view of the flexure-based adjustment mechanism 103 of FIGS. 2 and 3 for adjusting/translating the tool position in the k direction.

In FIG. 6, a schematic illustration of the arrangement of the third adjustment mechanism 103 is shown for adjusting the tool in the k height direction. The adjustment mechanism 103 includes a lever-type flexure assembly having a base 128 connected to a lever arm (platform) 129 via a flexure hinge, such as notch hinge 130. Additionally, the adjustment mechanism 103 includes an actuator, such as manual micrometer adjuster 133 connects to an input end of the lever arm 129, and held against the base 128 via spring 135. In this arrangement, the lever arm 129 has a mechanical advantage that reduces the load on the adjuster and improves the precision of the height adjustments of the cutting tool, which is held at tool mount 132 at the output end of the lever arm. To move the tool in the k direction, the user turns the manual micrometer adjuster 133, which causes the other end of the micrometer to retract or extend in either the k or –k direction. As the tool height is adjusted, the cutting edge traverses a wide arc, moving primarily in the k direction with a relatively small displacement in the i direction. This parasitic error motion in the i direction is a function of the magnitude of the height adjustment and ranges from 0 to 0.1%. The flexure hinge constrains motion in the other degrees of freedom. Similar to the flexure hinges used in the other adjustment mechanisms 101 and 102, the notch-hinge on the height adjustment mechanism 103 has a narrow neck that allows the material to bend elastically. Also, a hardstop 131 is provided to prevent the lever arm 129 from moving too far and plastically deforming/damaging the notch-hinge.

Figure 7:
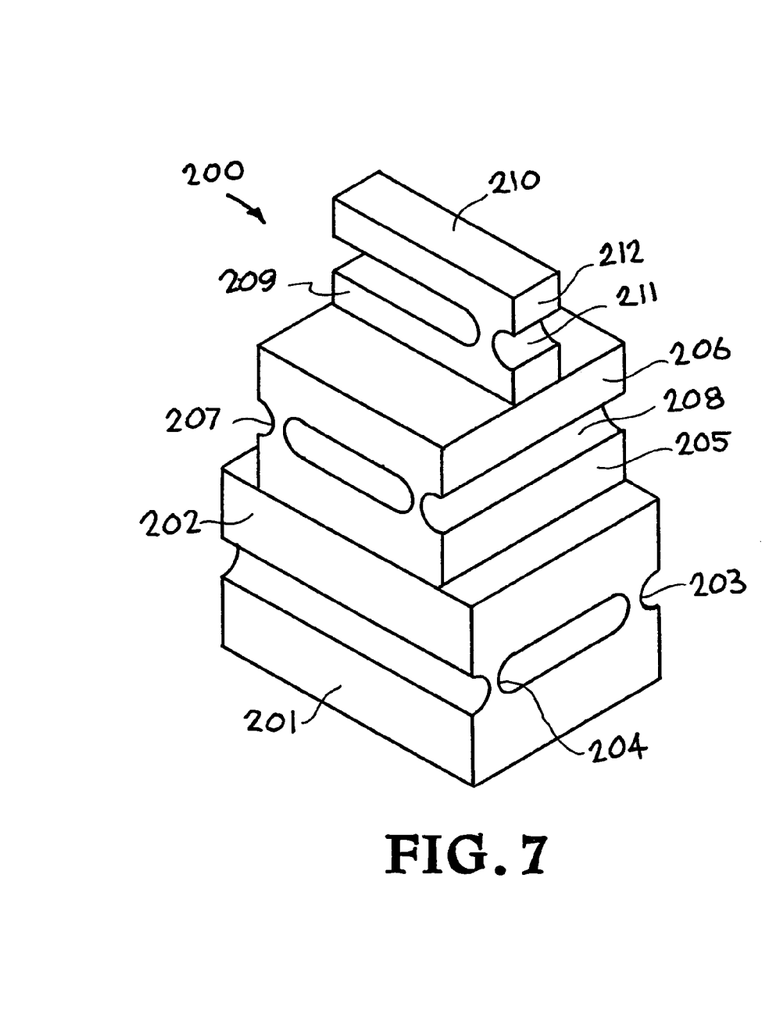
FIG. 7 is an isometric view of a schematic arrangement of the tool holder of the present invention illustrating the stacking of the various platforms and platform bases.
Figure 8:
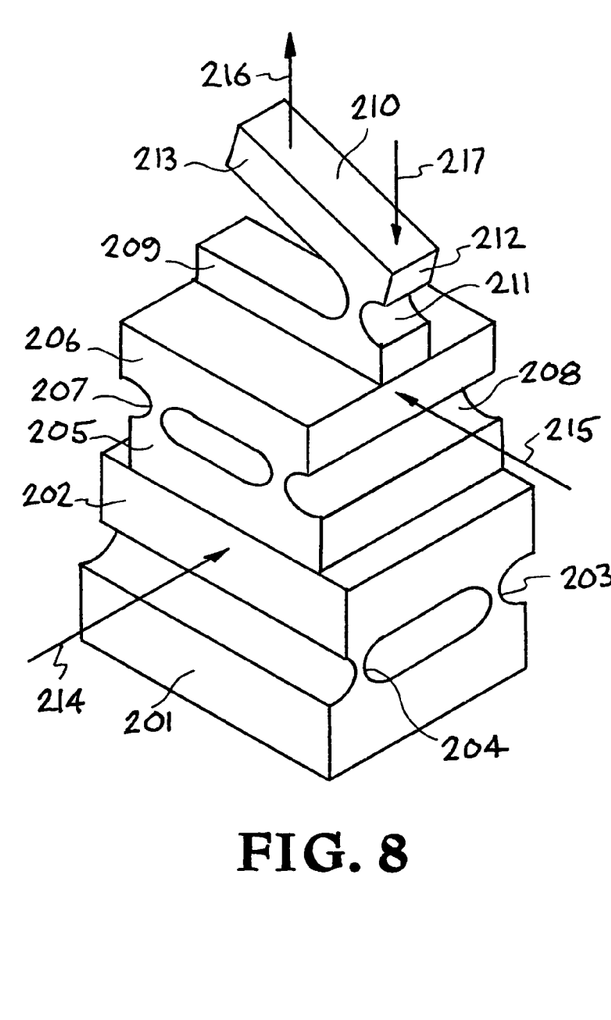
FIG. 8 is an isometric view of a schematic arrangement of the tool holder of the present invention illustrating the relative motion between the various stacked platforms and platform bases when actuated in the directions indicated by arrows 214-216.

Thus, after clamping the cutting tool in place on the tool holder, its position is adjusted using the manual micrometer adjusters 120, 125, and 133. The i-motion and j-motion adjustment mechanisms 101 and 102 are used to adjust the position of the tool so that the center of the nose radius of the tool is aligned with the axis of rotation of the B-axis. The height adjustment mechanism 103 moves the tool in the k direction to align the cutting edge with the C-axis (the spindle of the machine tool). FIGS. 7 and 8 generally illustrate the relative motions involved in adjusting the tool holder of the present invention in the three ijk directions. FIG. 7 shows a first base 201 connected to a first platform 202 via flexure hinges 203, 204 (and shown without legs). A second base 205 is connected to the first platform, and a second platform 206 is connected to the second base 205 via flexure hinges 207, 208. And a third base 209 is connected to the second platform, and a third platform/lever arm is shown connected to the third base via a single flexure hinge 211. FIG. 7 shows the three-tiered structure in a non-actuated state. In contrast, FIG. 8 shows the structure with each tiered experiencing an actuation force. In particular, a force 214 is exerted on the first platform 202, a second force 215 is exerted on the second platform 206, and a third force is exerted on one end of lever arm 210 such that an opposite end is displaced in the direction of arrow 217.

The tool holder of the present invention is preferably dimensioned to fit inside a well-defined envelope that is set by the dimensions of commercial four-axis diamond turning machines. The tool holder must align the cutting edge of the tool at the precise height of the axis of the machine tool spindle, and it must align the center of the tool nose with the axis of rotation of the B-axis. The tool holder must be an appropriate size for the B-axis platform, and it must also have sufficient clearance on the sides to avoid contact with the nose cone mounted on the machine tool spindle when the B-axis is rotated through angles of up to ±110°.

Since the tool holder is preferably designed to be used when machining with a variety of both water-based and oil-based cutting fluids, it must have adequate corrosion resistance for this environment. The tool holder must also have good thermal stability and a relatively small coefficient of thermal expansion. In order to obtain the desired corrosion resistance, high strength, modulus of elasticity, and coefficient of thermal expansion at a reasonable cost, the flexures were made from type 403 martensitic stainless steel. Annealed type 403 stainless steel, is preferably used, having a tensile yield strength of approximately 275 MPa, which can be increased significantly by heat-treating. This material has a coefficient of thermal expansion of approximately $10 \times 10^{-6}/°$ C., and an elastic modulus of 200 GPa, which is typical of most steels.

ILLUSTRATIVE EXAMPLE

Finite element analyses is preferably performed to determine the geometry of the flexure hinges so that it would be manufacturable, have appropriate stiffness, and experience appropriate stresses during operation. For example, the finite element analyses of the flexure-based adjustment mechanisms were performed using ANSYS with plane strain elements of type PLANE2. The variables considered in the finite element analyses were the width of the platform in the direction parallel to the flexure hinge, the thickness of the web of the flexure hinge, the notch radius on either side of the web, and the length of the straight section between the fillets.

To make the flexure assemblies manufacturable at a reasonable cost, the thickness of the narrow web of the flexure hinge was set at 0.5 mm, because this dimension could easily be achieved using a wire EDM process. The design selected after performing numerous finite element analyses uses a notch radius of 2.5 mm and incorporates a straight section of length 1 mm between the fillets, which reduces the bending stiffness of the hinge to decrease the load on the manual adjusters. A finite element analysis indicates that a load of 47.6 N is required to deflect the flexure 60 μm, which corresponds to full extension or retraction of the manual adjuster. In this condition, the maximum Von Mises stress in the hinge is approximately 73 MPa, which is 27% of the yield strength of the annealed material.

A safety factor is created in the flexures by heat-treating the material at 980° C. and tempering at 650° C. This heat-treating process should theoretically increase the yield strength of the stainless steel to 586 MPa. Therefore, the stress experienced when the i- and j-motion flexures bottom out against the hardstops is 47% of the theoretical yield strength of the heat-treated material. However, it is important to note that the actual yield strength obtained in the central sections of large heat-treated components may be smaller than the theoretical value. For this reason, the minimum possible yield strength, 275 MPa, is used as the design criteria for the flexure, and the material is heat-treated to provide a safety factor.

Finite element analyses is also preferably used to design the lever flexure. In the example case, the notch-hinge on each lever flexure has a web of thickness 0.8 mm, a notch radius of 2.5 mm, and a straight section of length 1 mm between the fillets. A finite element analysis indicates that when the i-motion flexure deflects 224 μm and bottoms out on the hardstop, the Von Mises stress in the fulcrum notch-hinge of the lever flexure is 555 MPa. To prevent the notch-hinge from plastically deforming in this scenario, the lever flexures are heat-treated at 980° C. and tempered at 315° C. to increase the yield strength of the stainless steel to 965 MPa. Note that because of the relatively small size and aspect ratio of these parts, heat-treating them to the desired yield strength is not an issue. Therefore, when the i-motion flexure bottoms out on its hardstop, the Von Mises stress in the fulcrum notch-hinge of the lever flexure is only 58% of the yield strength of the material.

Thus the motion limit of the hardstop of the lever flexure was determined by calculating the displacement required for the Von Mises stress in the hinge to reach 275 MPa, which is the yield strength of annealed type 403 stainless steel. Finite element analysis indicated that the maximum Von Mises stress reaches 275 MPa at a displacement of 224 μm. Therefore, the hardstops were designed to limit deflection to 224 μm in this case. Similarly, with regard to the design of the hardstop of the height flexure, to reach a Von Mises stress of 275 MPa in the notch-hinge, the deflection of the hardstop must be 423 μm. Therefore, the hardstop limits the motion of the flexure to 423 μm. This deflection causes an internal bending moment of 1.60 N m in the notch-hinge. To prevent the notch-hinge from plastically deforming, a safety factor is created by heat-treating the material at 980° C. and tempering at 650° C. to increase the yield strength to 586 MPa. Therefore, the stress experienced when the height flexure bottoms out against the hardstop is 47% of the theoretical yield strength of the heat-treated stainless steel.

A static analysis of the lever flexure must be performed to determine the preloading force required by the extension spring to keep the lever in contact with the manual adjuster. A finite element analysis indicates that when the i-motion flexure deflects to its maximum working displacement of 60 μm, the fulcrum hinge of the lever flexure experiences an internal bending moment of 0.297 N m. A free body diagram of the lever flexure in this configuration appears in.

Recall that the load capacity of the manual adjusters is 100 N (22 lbf). To avoid damaging the adjusters, the service load on the adjusters is kept below 71.2 N (16 lbf). When the manual adjuster is extended to move the i-motion flexure 60 μm in the i direction, the compressive force between the i-motion flexure and the lever is 47.6 N. A moment balance about the fulcrum hinge of the lever flexure appears in the following equation:

$$\Sigma M\text{hinge} = 0 = -(F\text{spring})(0.0616\text{ m}) + (F\text{adjuster})(0.045\text{ m}) - (M\text{fulcrum}) - (F\text{flexure})(0.018\text{ m}) \quad (1)$$

Fadjuster=71.2 N, Mfulcrum=0.297 N m, and Fflexure=47.6 N. Therefore, Equation 1 indicates that the required preload force of the spring, Fspring, is 33.3 N.

When the manual adjuster is retracted to move the i-motion flexure 60 μm in the −i direction, the tensile force between the i-motion flexure and the lever is 47.6 N. For this scenario, Fspring=33.3 N, Mfulcrum=−0.297 N m, and Fflexure=−47.6 N. Therefore, the load on the adjuster, Fadjuster, is 19.9 N in this scenario, so there is no risk of damaging the adjuster.

Finite element analyses is also preferably performed to determine the stress in the fulcrum notch-hinge of the lever flexure when the manual adjuster is fully retracted, and when it is fully extended. The maximum Von Mises stress in these conditions is 159 MPa. Therefore, the stresses that occur in the lever flexure during normal operation are much lower than those that occur when the i- and j-motion flexures bottom out against the hardstops. The latter is the limiting case for the design of the lever flexure. During normal operation of the mechanisms that move the tool in the i and j directions, the maximum Von Mises stress in each lever flexure is only 58% of the yield strength of the annealed material, and only 16% of the theoretical yield strength of the heat-treated material.

Finite element analyses is also preferably performed to design the notch hinge of the height flexure so it would have appropriate stiffness and experience appropriate bending stresses. The notch-hinge on the height flexure consists of a 1 mm web between two circular notches of radius 4 mm. A finite element analysis indicates that when the manual adjuster is fully extended or retracted 150 μm, the Von Mises stress in the hinge reaches 79 MPa, which is 29% of the yield stress of annealed type 403 stainless steel. This deflection causes an internal bending moment of 0.459 N m in the notch-hinge. A preload extension spring keeps the manual adjuster against the base of the flexure. An analysis similar to that presented in Eq. 1 indicates that a preload force of the extension spring of 33.3 N is more than adequate for this flexure.

The performance of the tool holder was determined by measuring its motion using capacitance probes. A precision ground parallel bar was inserted into the tool holder in the location where a cutting tool would normally be mounted. Three capacitance probes measured the displacement of the bar in the i, j, and k directions. Each capacitance probe has a range of 50 μm, a peak-to-valley resolution of 6 nm, and RMS resolution of 0.5 nm. The amplifier for each probe produces a voltage with a sensitivity of 0.4 V/μm, which was collected by a multi-channel digital storage oscilloscope.

The cross-talk between the axes was determined by moving each actuator independently and measuring the displacements in the i, j, and k directions. To make these measurements, the oscilloscope was set to a vertical scale of 1.0 V/major division, which corresponds to a resolution of 0.1 μm. The manual micrometer adjuster connected to the i-motion flexure was rotated by hand to move the precision bar 4 μm in the i direction. The data collected by the three capacitance probes is plotted in FIG. 9.

Figure 9:
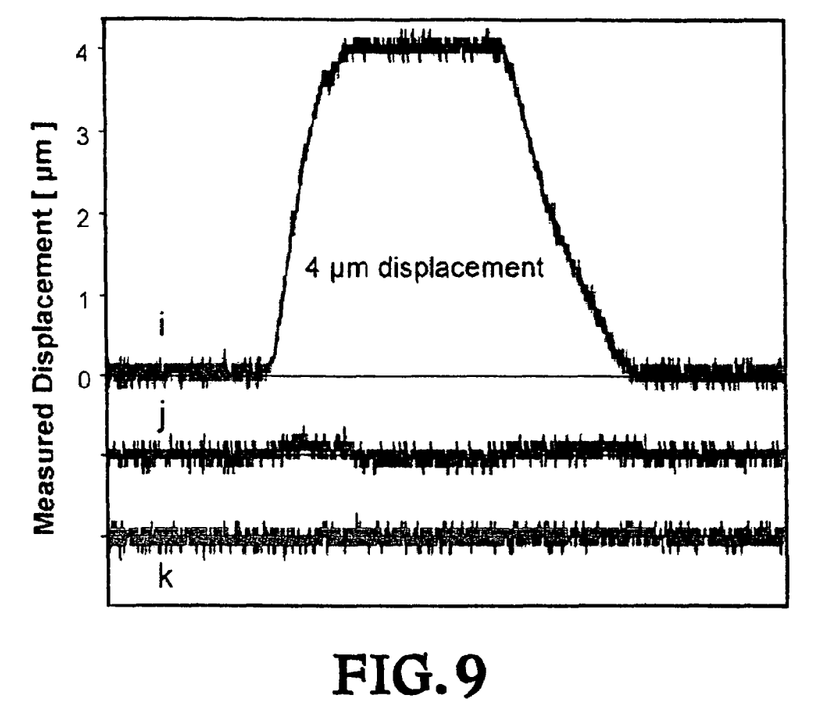
FIG. 9 is a graph showing displacements of the tool holder of the present invention measured by capacitance probes for a 4 µm displacement in the i direction.

When the manual micrometer adjuster connected to the i-motion flexure was rotated, the motion in the j and k directions was less than the 0.1 μm resolution of the system. As shown in FIG. 9, small elastic displacements occurred as the manual micrometer adjuster was rotated, but no significant net displacements occurred in the j or k directions after the knob on the manual micrometer adjuster was released. Similar tests revealed that the parasitic error motions that accompanied adjustments in the j and k directions were also less than the 0.1 μm resolution of the measurement system.

Figure 10:
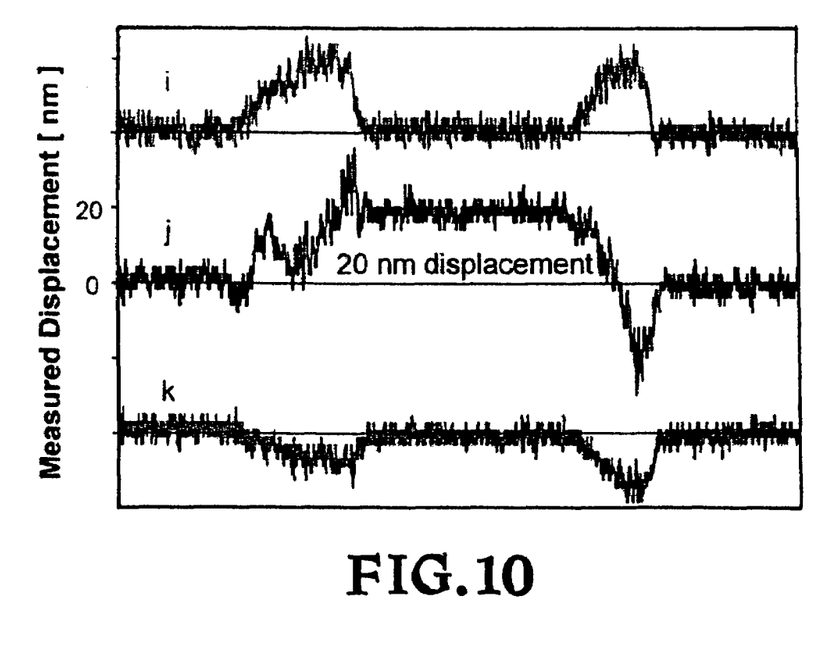
FIG. 10 is a graph showing displacements of the tool holder of the present invention measured by capacitance probes for a minimal displacement in the j direction.

To determine the minimum increment of motion of the tool holder in the i, j, and k directions, each of the manual micrometer adjusters was rotated the smallest amount possible that produced a noticeable, controlled displacement. To make these measurements, the oscilloscope was set to a vertical scale of 20 mV/major division. FIG. 10 contains a plot of the data measured by the three capacitance probes when the tool holder was moved approximately 20 nm in the j direction and then back to its original position. As the manual micrometer adjuster connected to the j-motion flexure was rotated, the tool holder deflected elastically in the i and k directions, but no noticeable net displacements occurred in the i or k directions after the knob on the manual micrometer adjuster was released.

Similar tests were performed to determine the minimum increment of motion of the tool holder in the i and k directions. The minimum increment of motion of the tool holder in the i direction was also approximately 20 nm, and the minimum increment of motion in the k direction was approximately 13 nm.

The flexure-based tool holder is not as stiff as some commercially available tool holders intended for four-axis diamond turning. One disadvantage of using flexures to achieve precise alignment of the cutting tool is that they have a relatively small stiffness.

To determine the stiffness of the flexure-based tool holder, a precision ground steel bar with a height of 9.5 mm and a width of 6.4 mm was used to mimic the shank of a cutting tool mounted in the tool holder. Forces were applied to the bar with a force transducer, and its deflection was measured with a capacitance probe. The forces were applied and the deflections were measured at a point on the bar located 15 mm from the end of the tool holder, which is the approximate location at which the cutting edge of a tool would normally be located. Therefore, the measured stiffness represents an actual machining operation by including both the tool holder and the tool shank. The measured static stiffness of the system was approximately 8 MN/m in the i direction, 2 MN/m in the j direction, and 4 MN/m in the k direction. For many machining applications, the stiffness of the flexure-based tool holder is much larger than required.

There are some machining applications in which the stiffness of the tool holder is very important. For example, when attempting to diamond turn a workpiece with the best possible surface finish, the structural loop between the tool and the workpiece should be as stiff as possible. If the tool holder is the greatest source of compliance in the system, then its stiffness is particularly important. In applications for which the stiffness of the tool holder is more important than the tool setting accuracy, a commercially available tool holder may work well. One commercial tool holder that uses sliding plates preloaded with set screws rather than flexures was measured to be approximately 2-3 times as stiff as the flexure-based tool holder.

Often, the ability to set the tool with sub-µm accuracy is far more important than maximizing stiffness. The stiffness of the tool holder is not an issue for many applications, such as when diamond turning with a small nose radius tool or with small depths of cut. The flexure-based tool holder has greatly facilitated the manufacture of meso-scale components with complex three-dimensional shapes with sub-µm profile accuracies, such as components for laser targets.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. An apparatus for controlling the spatial position of an article comprising:
   a first adjustment mechanism having a first base fixed relative to an ijk coordinate system, a first platform, at least two parallel flexure hinges connecting the first platform to the first base to enable and guide movement of the first platform in a direction parallel to the i axis of the ijk coordinate system, and means for actuating the first platform to adjust the i-axis position thereof relative to the first base;
   a second adjustment mechanism having a second base fixed relative to the first platform, a second platform, at least two parallel flexure hinges connecting the second platform to the second base to enable and guide movement of the second platform in a direction parallel to the j axis of the ijk coordinate system, and means for actuating the second platform to adjust the j-axis position thereof relative to the second base; and
   a third adjustment mechanism having a third base fixed relative to the second platform, a third platform having means for holding the article thereon, at least one flexure hinge connecting the third platform to the third base to guide movement of a held article in a direction parallel to the k axis of the ijk coordinate system, and means for actuating the third platform to adjust the k-axis position of the held article relative to the third base.

2. The apparatus of claim 1,
   wherein at least one of the pairs of first platform/second base, and second platform/third base, is formed as a monolithic unit.

3. The apparatus of claim 1,
   wherein said flexure hinges each comprise a rigid leg and a pair of notch hinges each connecting an end of the rigid leg to a platform or base of a platform/base pair.

4. The apparatus of claim 1,
   wherein said means for actuating the first platform includes: a first lever with a pivot fulcrum fixed to the first base and a lever end abutting the first platform; and means for actuating the first lever to actuate the first platform.

5. The apparatus of claim 4,
   wherein said first lever includes a flexure hinge to maintain the orientation of the lever end abutting the first platform when actuated by the first lever.

6. The apparatus of claim 4,
   wherein the means for actuating the first lever is a manual micrometer adjuster abutting the lever and a preload spring holding the adjuster against the lever.

7. The apparatus of claim 1,
   wherein said means for actuating the second platform includes: a second lever with a pivot fulcrum fixed to the second base and a lever end abutting the second platform; and means for actuating the second lever to actuate the second platform.

8. The apparatus of claim 7,
   wherein said second lever includes a flexure hinge to maintain the orientation of and contact with the second platform when actuated by the second lever.

9. The apparatus of claim 7,
   wherein the means for actuating the first lever is a manual micrometer adjuster abutting the lever and a preload spring holding the adjuster against the lever.

10. The apparatus of claim 1,
    wherein said third platform is a third lever with a pivot fulcrum connected to the third base and the means for holding the article on an end of the third lever; and wherein the means for actuating the third platform includes means for actuating the third lever to actuate the held article.

11. The apparatus of claim 10,
    wherein the means for actuating the first lever is a manual micrometer adjuster abutting the lever and a preload spring holding the adjuster against the lever.

12. A tool holder for controlling the relative spatial position of a tool on a B-axis platform of a four axis lathe, comprising:
  a first flexure-guided stage having at least two flexure hinges capable of flexing only in an i-axis direction of an ijk orthogonal coordinate system which is fixed relative to the B-axis platform, for guiding the tool in a direction of the i-axis;
  a second flexure-guided stage having at least two flexure hinges capable of flexing only in a j-axis direction of the ijk orthogonal coordinate system, for guiding the tool in a direction of the j-axis;
  a third flexure-guided stage having means for holding a tool thereon and at least one flexure hinge capable of flexing only in a k-axis direction of an ijk orthogonal coordinate system for guiding the tool in a direction of the k-axis;
  a first actuator for actuating the first flexure-guided stage to adjust the i-axis position of a held tool;
  a second actuator for actuating the second flexure-guided stage to adjust the j-axis position of the held tool; and
  a third actuator for actuating the third flexure-guided stage to adjust the k-axis position of the held tool.

* * * * *